United States Patent [19]
Boltz et al.

[11] Patent Number: 5,412,869
[45] Date of Patent: May 9, 1995

[54] MAKING A CELL FOR A MOTOR-VEHICLE LATENT-HEAT STORAGE UNIT

[75] Inventors: Hartmut Boltz, Brey; Richard Christ, Emmelshausen; Karl-Josef Jakobi, Geisenheim, all of Germany

[73] Assignee: Fritz Werner Prazisionsmaschinenbau GmbH, Geisenheim, Germany

[21] Appl. No.: 163,081

[22] Filed: Dec. 7, 1993

[30] Foreign Application Priority Data

Dec. 8, 1992 [DE] Germany .................. 42 41 214.5
Sep. 7, 1993 [DE] Germany .................. 43 30 204.1

[51] Int. Cl.$^6$ ................................................ B23P 15/26
[52] U.S. Cl. ..................... 29/890.032; 29/890.053; 29/422
[58] Field of Search .................. 29/890.032, 890.053, 29/422, 890.03; 165/104.21, 104.14, 104.26

[56] References Cited

U.S. PATENT DOCUMENTS

| | | | |
|---|---|---|---|
| 3,797,086 | 3/1974 | Asselman | 29/890.032 |
| 4,106,171 | 8/1978 | Basiulis | 29/890.032 |
| 4,353,415 | 10/1982 | Klaschke et al. | 165/104.21 |
| 5,029,389 | 7/1991 | Tanzer | 165/104.26 |
| 5,222,298 | 6/1993 | Schatz | 29/890.03 |

FOREIGN PATENT DOCUMENTS

| | | | |
|---|---|---|---|
| 4036392 | 5/1992 | Germany . | |
| 0045493 | 3/1983 | Japan | 29/890.032 |
| 0918731 | 4/1982 | U.S.S.R. | 29/890.032 |

*Primary Examiner*—Irene Cuda
*Attorney, Agent, or Firm*—Herbert Dubno; Andrew Wilford

[57] ABSTRACT

A motor-vehicle latent-heat storage unit is made by first positioning an elongated rectangular sheet-metal blank over a longitudinally extending slot formed in a die and then pressing an elongated anvil bar forming one of a pair of ultrasonic welding tools down against the blank over the slot to push the bar and the blank into the slot. This imparts to the blank a U-section and leaves longitudinally extending edge regions of the blank projecting out of the slot past the anvil bar. These edge regions are then folded transversely one after the other inward over the bar to form the blank into a tube with the edge regions overlapping each other. The other of the ultrasonic welding tools is subsequently pressed against the overlapped edge regions and therethrough against the anvil bar to ultrasonically weld together the overlapped edge regions along a full length of the tube. Finally the welded tube and the bar are moved longitudinally relative to each other to separate the tube from the bar.

10 Claims, 7 Drawing Sheets

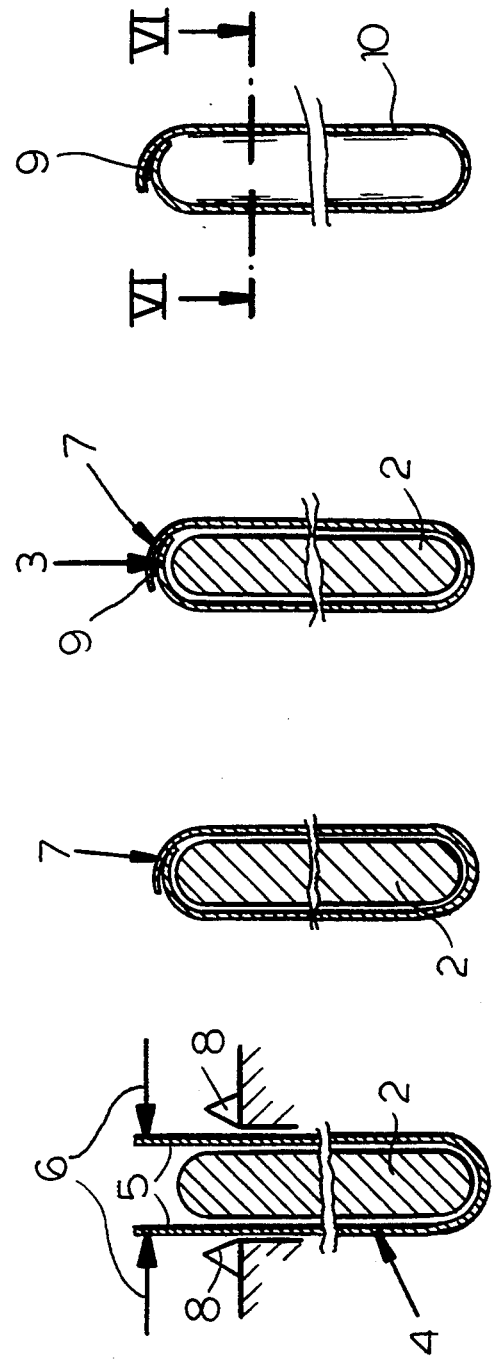

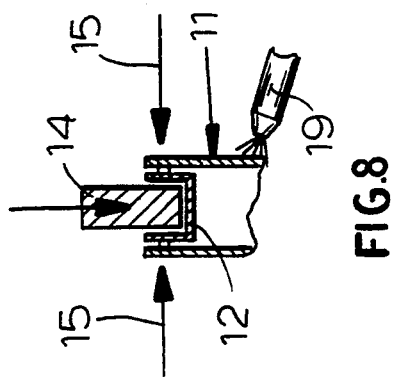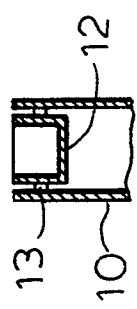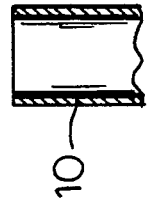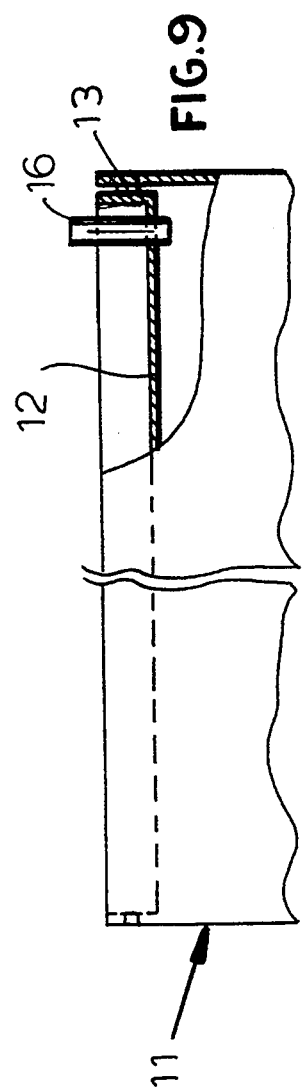

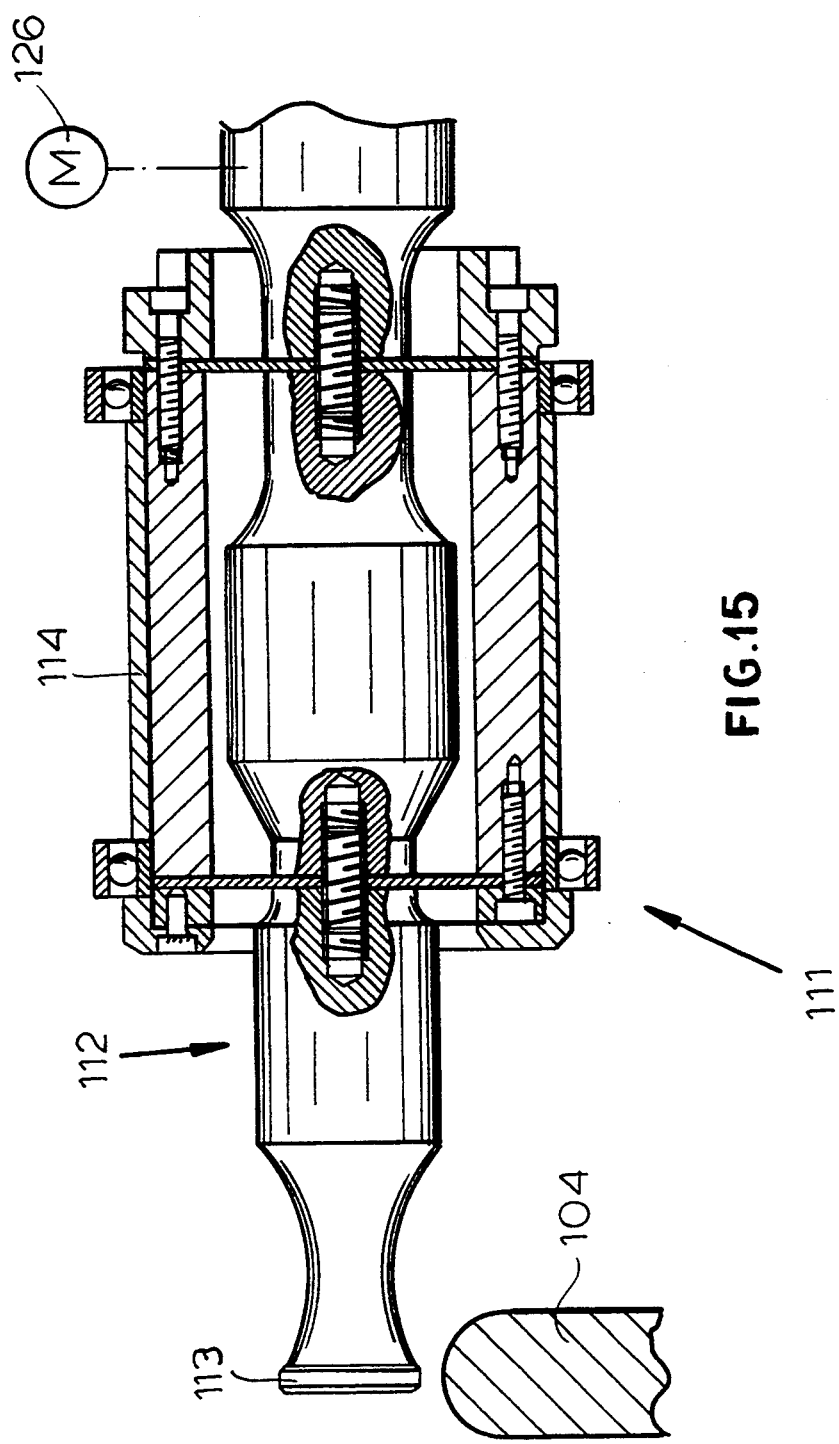

MAKING A CELL FOR A MOTOR-VEHICLE LATENT-HEAT STORAGE UNIT

FIELD OF THE INVENTION

The present invention relates to a motor-vehicle latent-heat storage unit. More particularly this invention concerns a method and apparatus for making a cell or heat pipe for such a unit.

BACKGROUND OF THE INVENTION

A motor-vehicle latent-heat storage unit is typically provided between the vehicle engine and the heating system and has a pack of cells or heat pipes each comprised of an elongated plate-shaped tube filled with a latent-heat storage medium. In a chemical-phase system the storage medium is barium hydroxide and water (octahydrate) and the envelope surround it is made of oxygen-free copper or nickel-plated steel. For best heat exchange the metallic envelope is only several tenths of a millimeter thick.

The main problem with these systems is that the cells are subject to considerable stresses. They are heated and cooled during normal operation so that they will inherently expand and contract, and the internal phase changes are responsible for further changes in volume. Similarly the liquid inside them will expand and contract so that the internal pressure can vary quite a bit. Finally when employed in a motor vehicle they are subject to the dynamic shocks and stresses anything in a road vehicle has to withstand. Clearly it is difficult to build a cell that is sufficiently thin walled to ensure good heat transfer between its contents and the heat-transfer fluid surrounding it yet strong enough to withstand the stresses it is subjected to during normal use.

Accordingly it is known from German patent document 4,036,392 to use seamless tubing to have an envelope of maximum strength. Unfortunately making seamless tubing of the necessary thin wall thickness is extremely difficult. In this system the procedure is complex since the seamless tube is made from a flat plate of sheet metal into which an annular frame of a spacer tube is soldered. When the solder location is heated there are normally problems as the thin walls cannot withstand substantial pressure, as must be exerted by the iron during the soldering operation.

OBJECTS OF THE INVENTION

It is therefore an object of the present invention to provide an improved method of and apparatus for making a cell for a motor-vehicle latent-heat storage unit.

Another object is the provision of such an improved method of and apparatus for making a cell for a motor-vehicle latent-heat storage unit which overcomes the above-given disadvantages, that is which produces a very robust cell in a manner subject to low-cost mass production.

A further object is to provide an improved cell for a motor-vehicle latent-heat storage unit.

SUMMARY OF THE INVENTION

A motor-vehicle latent-heat storage unit is made according to the invention by first positioning an elongated rectangular sheet-metal blank over a longitudinally extending slot formed in a die and then pressing an elongated anvil bar forming one of a pair of ultrasonic welding tools down against the blank over the slot to push the bar and the blank into the slot. This imparts to the .blank a U-section and leaves longitudinally extending edge regions of the blank projecting out of the slot past the anvil bar. These edge regions are then folded transversely one after the other inward over the bar to form the blank into a tube with the edge regions overlapping each other. The other of the ultrasonic welding tools is subsequently pressed against the overlapped edge regions and therethrough against the anvil bar to ultrasonically weld together the overlapped edge regions along a full length of the tube. Finally the welded tube and the bar are moved longitudinally relative to each other to separate the tube from the bar.

Ultrasonic welding in effect makes a seamless tube, as strong as one that is extruded in one piece, because the weld unites the material at a molecular level. This is done without weldment, that is without interposing solder or another material between the surfaces being joined, merely by fusing the two parts together. Since the surfaces are tightly pinched between the two tools it is possible to form a very strong seam that can easily withstand the considerable stresses such a cell is subjected to in use. Since the anvil is inside the tube, the considerable pressure brought by the sonotrode cannot collapse the tube.

The blank of this invention is made of technically pure and substantially oxygen-free copper or of nickel-plated steel. The bar has a thickness of about 5 mm. The blank is at most a few tenths of a millimeter thick.

According to the invention after separating the tube from the bar an outwardly concave plug is inserted into an end of the tube and solder is provided in the tube end between the plug and the tube. A complementarily shaped press bar is positioned in the plug inserted into the tube, and the end of the tube is laterally pressed against the plug and the plug is thereby pressed against the bar while heating the plug and the tube end to solder the plug to the end of the tube. This effectively and solidly plugs the tube end. The plug and the tube are of the same material and the plug and tube end are heated inductively to melt the solder. In addition the tube is cooled adjacent the tube end during heating of the tube end and plug, preferably with an inert gas to avoid recrystallization of the metal. The plug is provided with a fill fitting.

The apparatus according to the invention has a die formed with a longitudinally extending and laterally open slot into which an elongated anvil bar is fittable. This bar forms an ultrasonic welding tool and is pressed down onto an elongated rectangular sheet-metal blank positioned over the slot to push the blank into the slot, impart to the blank a U-section, and leave longitudinally extending edge regions of the blank projecting out of the slot past the anvil bar. Slides are provided for folding the edge regions transversely one after the other inward over the bar and forming the blank into a tube with the edge regions overlapping each other. Another ultrasonic welding tool formed as a roller is pressed against the overlapped edge regions and therethrough against the anvil bar to ultrasonically weld together the overlapped edge regions along a full length of the tube. The roller tool is provided with a drive for rotating it and rolling it longitudinally along the tube on the overlapped edge regions. A controller rotates the roller at a predetermined peripheral speed and displaces it longitudinally along the tube at a displacement speed equal to the peripheral speed. This controller compensates for wear of the roller by adjusting the speeds. The drive means for the bar includes at least one threaded spindle extending transversely of the slot and threadedly operatively engaged with the bar. The bar is generally complementary to the slot.

BRIEF DESCRIPTION OF THE DRAWING

The above and other objects, features, and advantages will become more readily apparent from the following description, reference being made to the accompanying drawing in which:

FIGS. 1 through 8 are schematic diagrams illustrating the method of the invention, with FIG. 6 being a section taken along line VI—VI of FIG. 5;

FIG. 9 is a partly sectional detail view of an end of a pipe according to the invention;

FIG. 15 is a partly sectional view of a detail of the apparatus.

SPECIFIC DESCRIPTION

Figure 10:
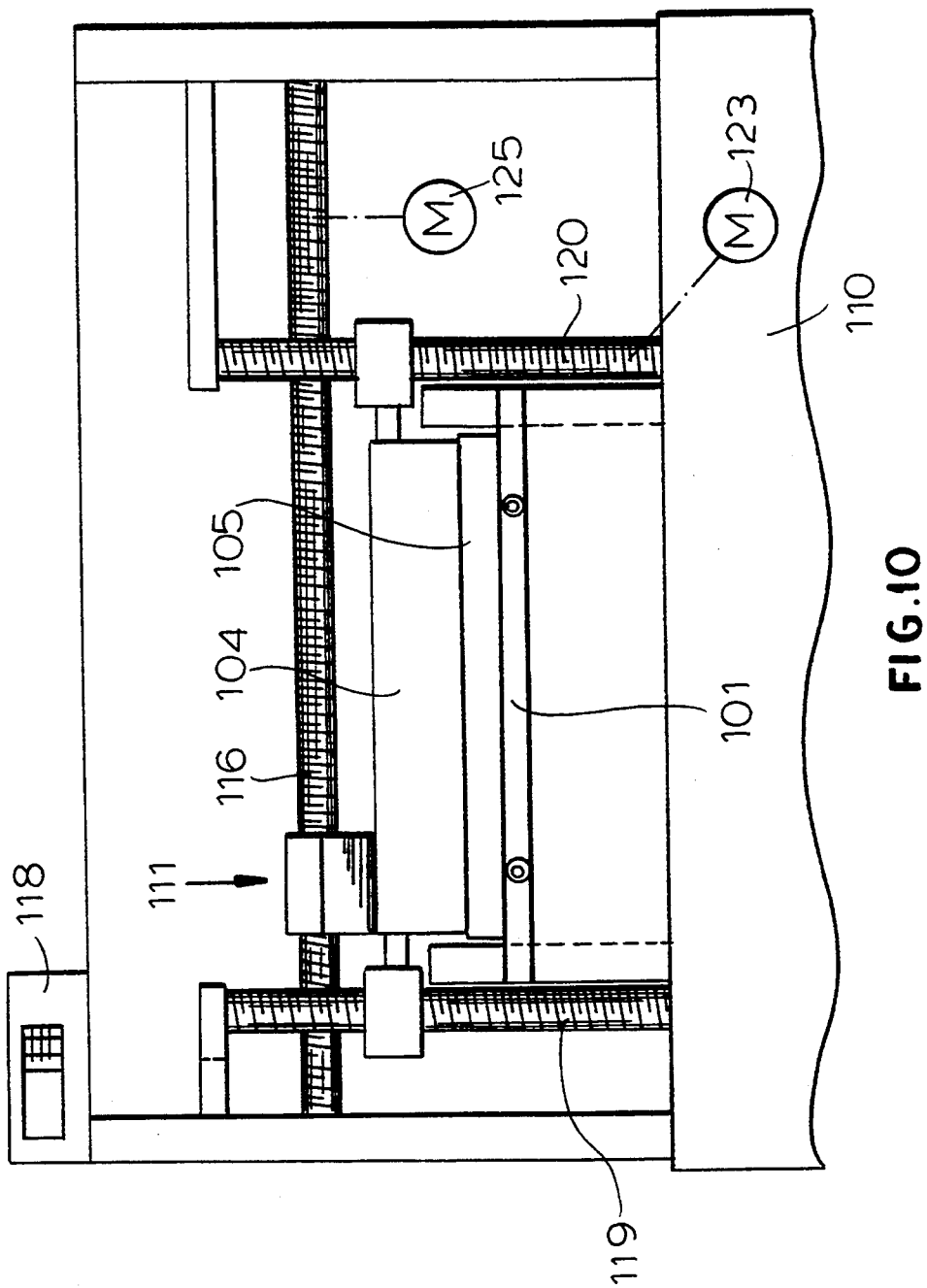
FIG. 10 is a side view of an apparatus for carrying out the method.

As seen in FIGS. 1 through 8, a latent-heat storage cell or heat pipe 11 is formed starting from (FIG. 1) an elongated rectangular sheet metal blank 1 that is laid atop two guides 8 flanking a slot 17 formed in a die 18. The blank 1 is made of oxygen-free pure copper and is at most several tenths of a millimeter thick.

To start with as shown in FIG. 2 an anvil bar 2 some 5 mm thick is pressed down on the center of the blank 1 directly over the slot 17 to force the blank 1 into it and transform it into a U-section intermediate part 4 having a pair of edge regions 5 that project up out of the slot 2 past the die 18. Then two tools indicated schematically at 6, which can in fact form the guides 8, are moved laterally in, one after the other, to fold the two edge regions 5 over and thereby form an overlap 7 shown in FIG. 3.

Then as shown in FIG. 4 another ultrasonic welding tool, a so-called sonotrode 3, is engaged with the overlap 7 to form thereat a longitudinally extending integral weld 9. Such a weld is extremely strong as it actually molecularly unites the two end regions 5. To form such a weld the tool shown schematically at 3 can be moved down toward the other tool 2 or the latter can be moved up. Subsequently the bar 2 is pulled axially out of the resultant tube 10 or the latter is pulled off the bar 2.

The open end of the tube 10, shown in longitudinal section in FIG. 6, is then closed by inserting into it a cup-shaped or U-section sheet-metal end plug 12 complementary to the end of the tube 10, that is of lozenge shape. A bead 13 of solder is provided all around the plug 12. Then an anvil 14 complementary to the outwardly concave shape of the plug 12 is fitted into it and heated soldering irons 15 are either pressed to either side of the outside of the end of the tube 10 or run around it as indicated in FIG. 8 to melt the solder, pressing the end region against the anvil 14 to avoid deforming the tube 10. To avoid crystallization of the adjacent metal, a jet of a cooling protective gas can be directed from a nozzle 19 at adjacent regions of the tube 1.

FIG. 9 shows how the plug 12 is provided with a filling fitting 16, here a throughgoing tube. This fitting 16 is used to introduce the latent-heat storage fluid into the tube 10 and is sealed permanently shut once the tube 10 has been filled.

Figure 11:
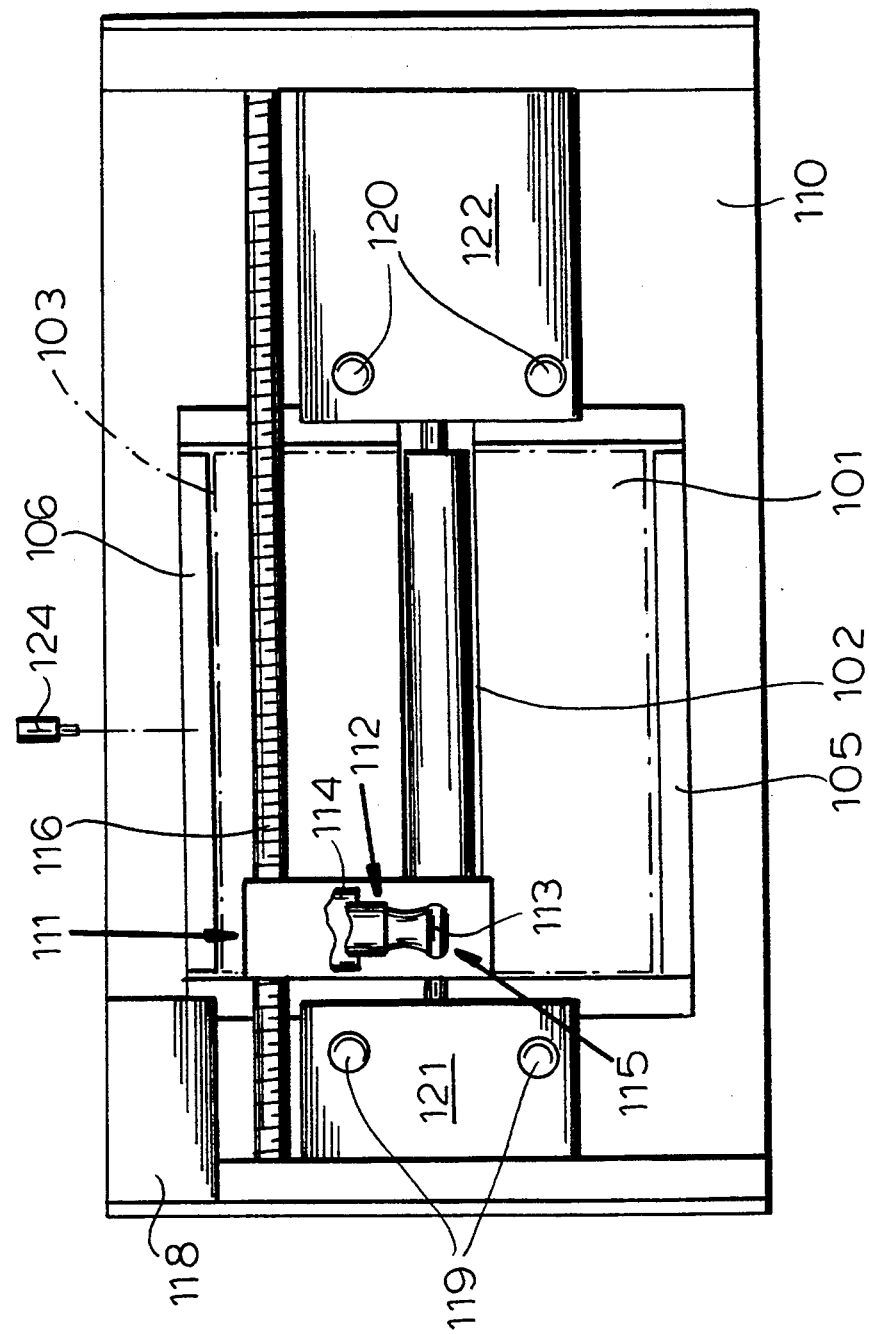
FIG. 11 is a top view of the apparatus of FIG. 10.
Figure 12:
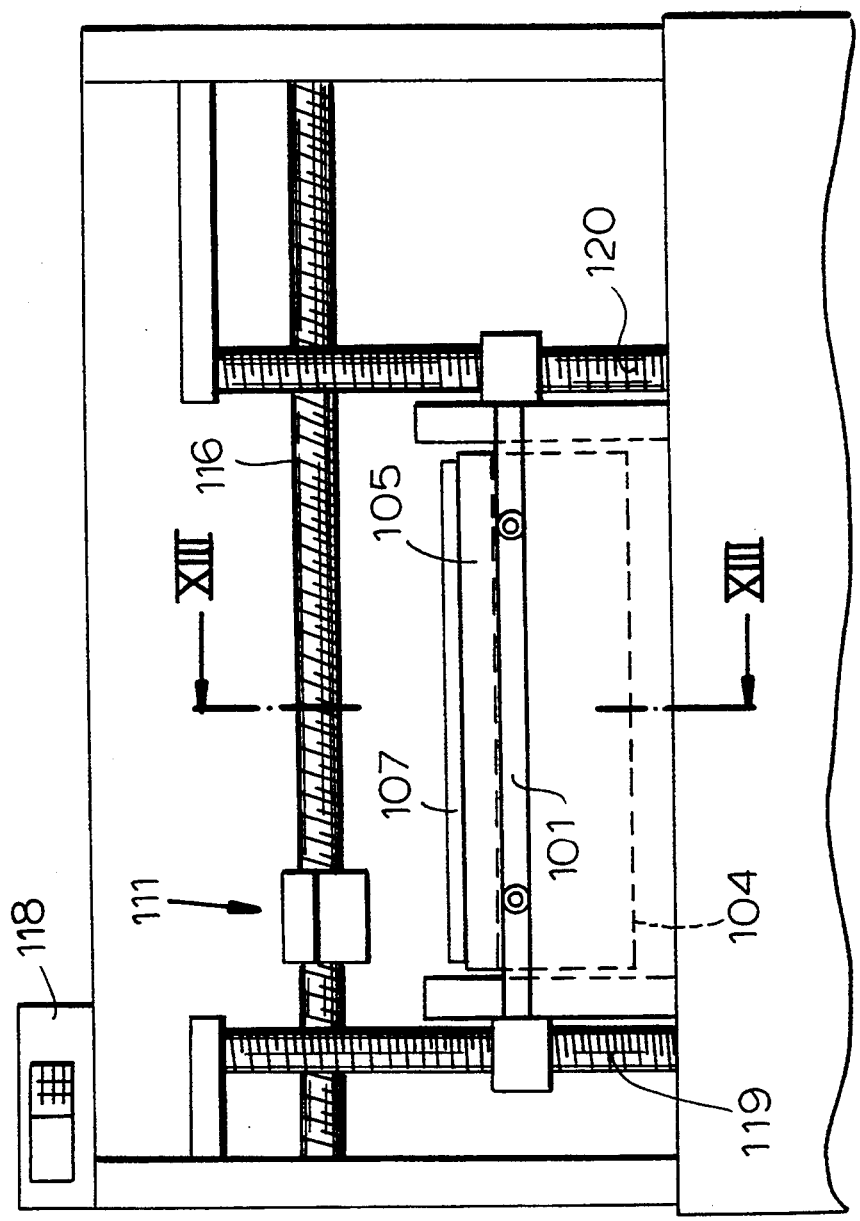
FIG. 12 is a view like FIG. 11 but with the apparatus in a different operational position.
Figure 13:
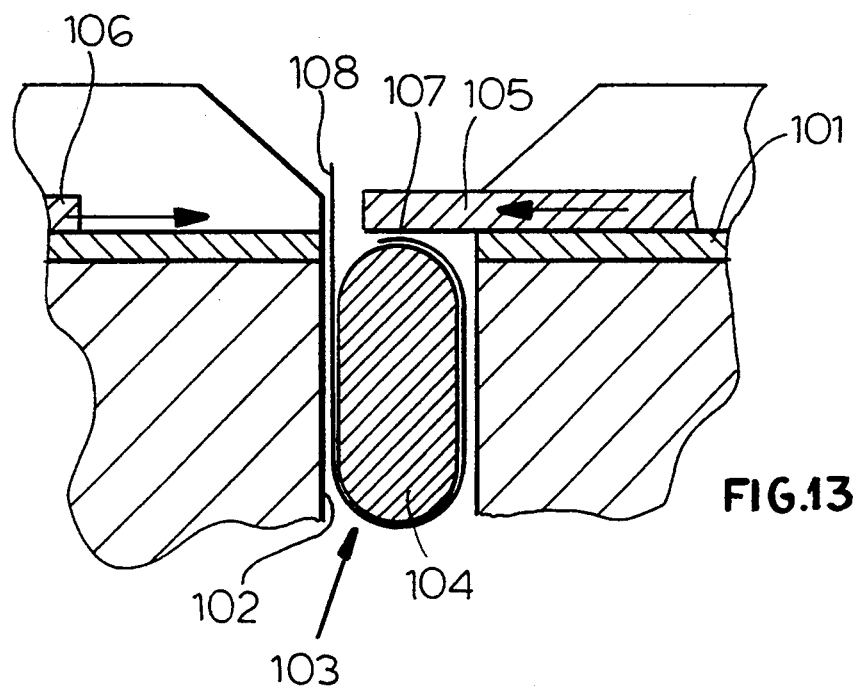
FIG. 13 is a section taken along line XIII—XIII of FIG. 12.
Figure 14:
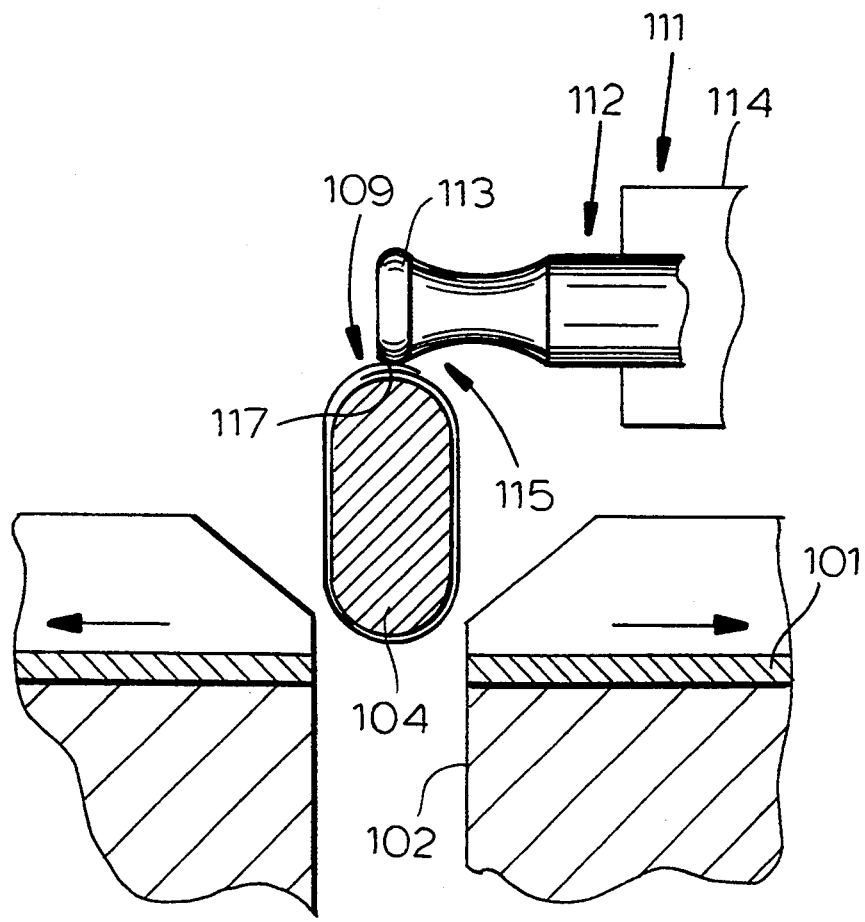
FIG. 14 is a view like FIG. 13 showing the parts in a different operational position.

FIGS. 10 through 15 show the apparatus for carrying out the above-described process. This apparatus has a frame 110 on which is mounted a die 101 formed with an upwardly open slot 102 above which is positioned a flat sheet-metal blank 103. A horizontally elongated bar 104 forming an ultrasonic-welding anvil and of a shape complementary to that of the slot 102 is carried on supports 121 and 122 threaded on upright pairs of spindles 119 and 120 that can be rotated by a drive shown schematically at 123 for vertical displacement of this bar 104.

Two folding slides 105 and 106 movable by actuators such as shown schematically at 124 serve to fold over upstanding edge regions 107 and 108 of the workpiece 103 to form an overlap zone 109. Once the overlap zone 107 is formed, the two folding slides 105 and 106 are withdrawn and the bar 104 is lifted to raise the now tubular workpiece out of the slot 102.

Another ultrasonic welding tool 111 is constituted as a head 113 of a rod 112 rotatably supported in a support 114 displaceable longitudinally along the slot 102 by a threaded spindle 116 rotated by a drive illustrated schematically at 125. A drive indicated schematically at 126 in FIG. 15 rotates the head 113 at a peripheral speed identical to that of longitudinal advance of the support 114 along the workpiece 103. The tools 111 and 104 work together as the head 113 is rolled along the overlap zone 109 in a welding location 115 to produce an ultrasonic weld 117. A controller 18 operates the tool 104 and/or the tool 111 to produce the weld, and to move the bar 104 upward as it erodes, as inevitable with such a welding operation. In addition the controller adjusts the rotation of the rod 112 by the drive 126 as the head 113 wears and its diameter increases, to keep its peripheral speed identical to the tool-advance speed. The ultrasonic energy is normally produced by a piezoelectric or magnetostrictive oscillator in the sonotrode 11.

We claim:

1. A method of making a cell for a motor-vehicle latent-heat storage unit, the method comprising the steps of sequentially:

positioning an elongated rectangular sheet-metal blank over a longitudinally extending slot formed in a die;

pressing an elongated anvil bar forming one of a pair of ultrasonic welding tools down against the blank over the slot to push the bar and the blank into the slot, thereby imparting to it a U-section, and leaving longitudinally extending edge regions projecting out of the slot past the anvil bar;

folding the edge regions transversely one after the other inward over the bar, thereby forming the blank into a tube with the edge regions overlapping each other;

pressing the other of the ultrasonic welding tools against the overlapped edge regions and therethrough against the anvil bar to ultrasonically weld together the overlapped edge regions along a full length of the tube; and longitudinally relatively moving the welded tube and the bar to separate the tube from the bar.

2. The cell-making method defined in claim 1 wherein the blank is made of technically pure and substantially oxygen-free copper.

3. The cell-making method defined in claim 1 wherein the blank is made of nickel-plated steel.

4. The cell-making method defined in claim 1 wherein the bar has a thickness of about 5 mm.

5. The cell-making method defined in claim 1 wherein the welding is made weldment-free.

6. The cell-making method defined in claim 1, further comprising the steps after separating the tube from the bar of inserting an outwardly concave plug into an end of the tube;

providing solder in the tube end between the plug and the tube;

positioning a complementarily shaped press bar in the plug inserted into the tube; and laterally pressing the end of the tube against the plug and the plug against the bar while heating the plug and the tube end to solder the plug to the end of the tube.

7. The cell-making method defined in claim 6 wherein the plug and the tube are of the same material.

8. The cell-making method defined in claim 6 wherein the plug and tube end are heated inductively.

9. The cell-making method defined in claim 6, further comprising the step of cooling the tube adjacent the tube end during heating of the tube end and plug.

10. The cell-making method defined in claim 6 wherein the plug is provided with a fill fitting.

* * * * *